US011796984B2

(12) United States Patent
Akazawa et al.

(10) Patent No.: US 11,796,984 B2
(45) Date of Patent: Oct. 24, 2023

(54) ASSEMBLY SYSTEM

(71) Applicant: FANUC CORPORATION, Yamanashi (JP)

(72) Inventors: Takayuki Akazawa, Yamanashi (JP); Tatsuo Shinohara, Yamanashi (JP); Yuuichi Yamada, Yamanashi (JP); Naoki Yamaguchi, Yamanashi (JP); Takumi Mizuno, Yamanashi (JP); Takashi Ogura, Yamanashi (JP); Hikaru Fujita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/917,912

(22) PCT Filed: Apr. 22, 2021

(86) PCT No.: PCT/JP2021/016321
§ 371 (c)(1),
(2) Date: Oct. 7, 2022

(87) PCT Pub. No.: WO2021/220938
PCT Pub. Date: Nov. 4, 2021

(65) Prior Publication Data
US 2023/0152780 A1 May 18, 2023

(30) Foreign Application Priority Data
Apr. 27, 2020 (JP) .................................. 2020-078156

(51) Int. Cl.
G05B 19/41 (2006.01)
B23P 19/04 (2006.01)
(Continued)

(52) U.S. Cl.
CPC .......... G05B 19/4155 (2013.01); B23P 19/04 (2013.01); B25J 9/1669 (2013.01);
(Continued)

(58) Field of Classification Search
CPC ...... G05B 19/4155; G05B 2219/31063; G05B 19/418; B23P 19/04; B23P 21/004;
(Continued)

(56) References Cited

U.S. PATENT DOCUMENTS 10,882,188 B2 1/2021 Naitou
11,358,337 B2 * 6/2022 Czinger ............. G05B 19/4189
(Continued)

FOREIGN PATENT DOCUMENTS

JP 2008-265433 A 11/2008
JP 2008265433 A * 11/2008
(Continued)

OTHER PUBLICATIONS

Ueda et al.; JP-2008265433-A; Assembled Parts Registration System; EPO English Machine Translation; pp. 1-8 (Year: 2023).*
(Continued)

Primary Examiner — Bayan Salone
(74) Attorney, Agent, or Firm — Nakanishi IP Associates, LLC

(57) ABSTRACT

An object is to reduce the risk of outflow of defects and improve the work efficiency of assembly work. An assembly system 10 according to an embodiment of the present invention is used to assemble a finished product while sequentially placing and fixing multiple types of components to a workpiece. The assembly system 10 includes a collaborative robot 20 configured to collaborate with a worker 100, an identification information reading unit 27 configured to read identification information indicated on a component placed on the workpiece, and a controller 70
(Continued)

configured to determine whether a type of the component placed on the workpiece is correct or incorrect based on the read identification information and control the collaborative robot in accordance with a result of the correctness determination.

12 Claims, 7 Drawing Sheets

(51) Int. Cl.
 *B25J 9/16* (2006.01)
 *B25J 11/00* (2006.01)
 *B25J 19/02* (2006.01)
 *G05B 19/4155* (2006.01)
(52) U.S. Cl.
 CPC ........... *B25J 11/005* (2013.01); *B25J 19/023* (2013.01); *G05B 2219/31063* (2013.01)
(58) Field of Classification Search
 CPC ...... B25J 9/1669; B25J 11/005; B25J 19/023; Y02P 90/02
 See application file for complete search history.

(56) References Cited

U.S. PATENT DOCUMENTS

| | | | |
|---|---|---|---|
| 2018/0339456 A1 | 11/2018 | Czinger et al. | |
| 2019/0283253 A1* | 9/2019 | Naitou | .................. B25J 13/081 |
| 2021/0078182 A1* | 3/2021 | Watanabe | .............. B25J 9/1669 |

FOREIGN PATENT DOCUMENTS

| | | | | | |
|---|---|---|---|---|---|
| JP | 2015-176389 | A | | 10/2015 | |
| JP | 2015176389 | A | * | 10/2015 | |
| JP | 2019-155538 | A | | 9/2019 | |
| JP | 2019155538 | A | * | 9/2019 | ............. B25J 13/00 |
| JP | 2019-209401 | A | | 12/2019 | |
| JP | 2019209401 | A | * | 12/2019 | ............. B25J 13/06 |

OTHER PUBLICATIONS

International Search Report issued in PCT/JP2021/016321 dated Jul. 6, 2021 with English Translation (5 pages).
Written Opinion of International Searching Authority issued in PCT/JP2021/016321 dated Jul. 6, 2021 with English Translation (10 pages).

* cited by examiner

Facility number _____  Product type _____  Planned number _____
/actual number _____

Tack time
20 sec.

Collaborative robot C | Collaborative robot B | Collaborative robot A
In operation | In operation | In operation Conveyor device
In operation

| Workpiece conveyance completed | Screwing completed | Workpiece conveyance completed | Assembly inspection passed | Screwing in progress | Workpiece conveyance completed | Workpiece conveyance completed |
| Process 7 | Process 6 | Process 5 | Process 4 | Process 3 | Process 2 | Process 1 |

Alarm information

| Date and time of occurrence | Details of abnormality | |
|---|---|---|
| | | |
| | | |

| Process No. | One in charge | Work procedure | |
|---|---|---|---|
| | | Collaborative robot | Worker |
| Process 1 | Worker A | | S11: Place base on workbench<br>S12: Attach identification information (base number) |
| Process 2 | Worker B | | S21: Set component 1 on base<br>S22: Set component 2 on base |
| Process 3 | Collaborative robot A<br>Worker C | S31: Read base identification information<br>S32: Read identification information of components 1 and 2, and receive result of correctness determination<br>S33: Screw components 1 and 2<br>S34: Capture images of components 1 and 2, and determine fixation state<br>S36: Read identification information of component 3, and receive result of correctness determination<br>S37: Screw component 3 | S35: Set component |
| Process 4 | Collaborative robot B<br>Worker D | S41: Screw component 3 (remaining screws)<br>S42: Capture image of component 3, and determine fixation state<br>S44: Screw fixture | S43: Set fixture |
| Process 5 | Worker E | | S51: Set component 4 |
| Process 6 | Collaborative robot C<br>Worker F | S61: Read base identification information<br>S62: Read identification information of component 4, and receive result of correctness determination<br>S63: Screw component 4<br>S64: Capture image of component 4, and determine fixation state<br>S66: Read identification information of component 5, and receive result of correctness determination<br>S67: Screw component 5<br>S68: Capture image of component 5, and determine fixation state | S65: Set component 5 |
| Process 7 | Worker G | | S71. Visual inspection<br>S72. Carry out product |

FIG.5

ASSEMBLY SYSTEM

FIELD

Embodiments described herein relate generally to an assembly system.

BACKGROUND

As the working population declines, robots are being introduced into the manufacturing field. A robot system in which a robot and a worker collaborate in work related to manufacturing is disclosed (for example, Patent Literature 1). In such a robot system, inspection of manufactured products is important to prevent outflow of defective products.

Conventionally, in a product assembly process, a worker has performed visual inspection in accordance with a predetermined procedure in order to confirm the types of mounted components and the assembly state of components. However, the visual inspection by a worker has problems that the work time in one process is longer because the inspection time is added to the normal assembly work time, and that the quality of the visual inspection varies depending on the skill level, physical condition, etc. of the worker. By introducing a device dedicated to inspection instead of the visual inspection by a worker, the risk of outflow of defects, such as variation in inspection quality, mismounting of components, and assembly errors, can be reduced. However, in this case, it is necessary to newly provide a process dedicated to inspection in the middle of assembly work or after completion of assembly, which causes lowering of the overall assembly work efficiency.

CITATION LIST

Patent Literature

Patent Literature 1: Japanese Unexamined Patent Application Publication No. 2019-209401

SUMMARY OF INVENTION

Technical Problem

Therefore, it is desired to reduce the risk of outflow of defective products and to improve the work efficiency of assembly work.

Solution to Problem

An assembly system according to one aspect of the present disclosure is a system for assembling a finished product while sequentially placing and fixing multiple types of components to a workpiece. The assembly system includes a collaborative robot configured to collaborate with a worker, an identification information reading unit configured to read identification information indicated on a component placed on the workpiece, and a controller configured to determine whether a type of the component placed on the workpiece is correct or incorrect based on the read identification information and control the collaborative robot in accordance with a result of the correctness determination.

Advantageous Effects of Invention

According to this aspect, the risk of outflow of defects can be reduced and the work efficiency of assembly work can be improved.

BRIEF DESCRIPTION OF THE DRAWINGS

FIG. 4 is a diagram showing an example of a confirmation screen displayed on a touch panel display in FIG. 2.

FIG. 5 is a process diagram showing a work procedure of assembly work using the assembly system of FIG. 1.

DETAILED DESCRIPTION

Figure 1:
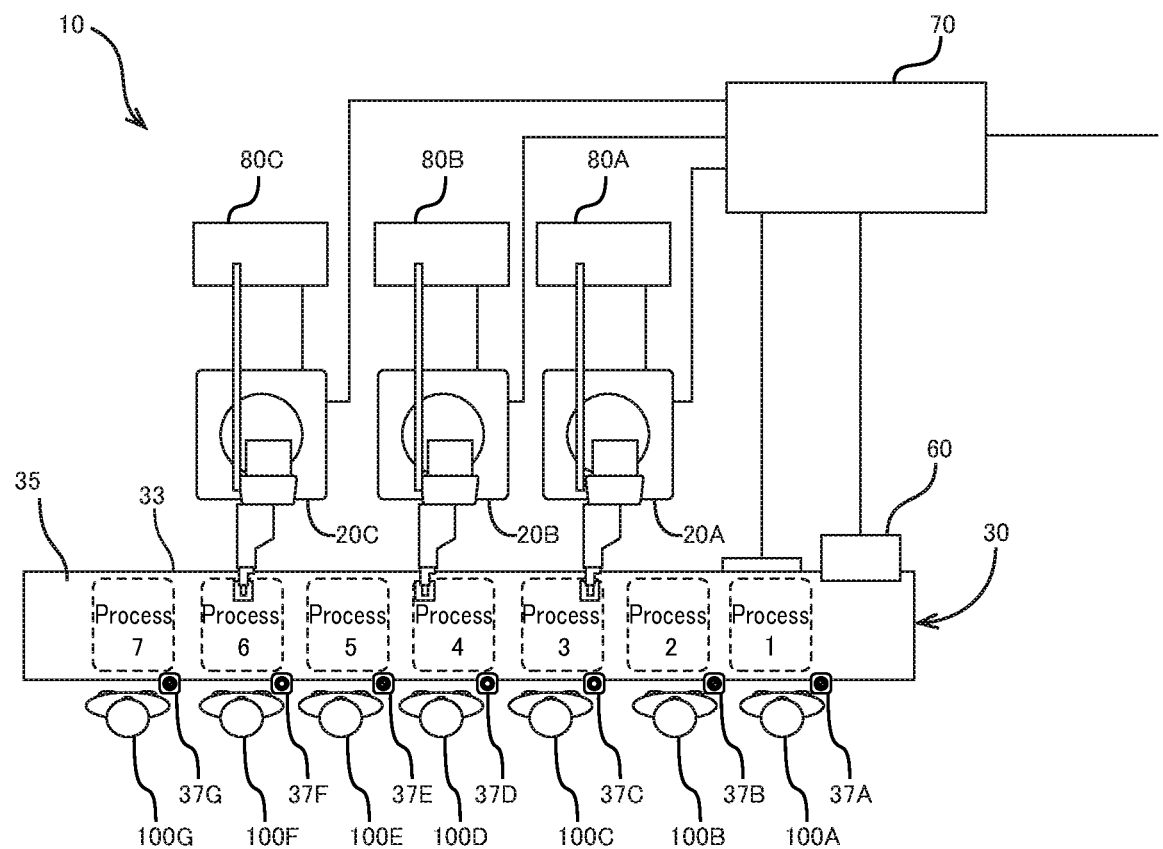
FIG. 1 is a plan view showing a configuration of an assembly system according to the present embodiment.

Hereinafter, an assembly system according to the present embodiment will be described with reference to the drawings. In the following description, constituent elements having substantially the same function and configuration are denoted by the same reference numeral, and a repetitive description will be given only where necessary.

(Overview of Assembly System)

The assembly system according to the present embodiment is a system for a worker and a collaborative robot to collaboratively conduct assembly work of a finished product. The finished product here represents the final product assembled by the assembly system, and does not necessarily represent the product to be finally sold.

One of the features of the assembly system according to the present embodiment is that a collaborative robot can take charge of work of confirming the type of a component and work of fixing a component to a workpiece (base component) among a plurality of work processes for assembling a finished product. By making a collaborative robot take charge of simple work which a collaborative robot is good at while making a worker take charge of relatively complicated work, and making the respective work times uniform, the overall manufacturing efficiency can be improved and variation in quality can be suppressed. For example, the collaborative robot takes charge of work of confirming a component, which is time-consuming for the worker, and work of fixing a component, in which the worker makes many mistakes and which is physically burdensome. The worker takes charge of work of placing a component on a workpiece, which is relatively complicated work using a template or a jig, in the entire processing.

(Configuration of Assembly System)

The assembly system according to the present embodiment is configured to be used for a line production system. A plurality of workers and a plurality of collaborative robots are arranged at prescribed positions beside a conveyor device, and conduct predetermined work on a workpiece conveyed by the conveyor device, thereby assembling a finished product. The assembly system is configured such that one worker takes charge of one work process. However, the assembly system may be configured such that one worker takes charge of a plurality of processes, or such that one worker and one collaborative robot collaborate in assembling a finished product.

As shown in FIG. 1, the assembly system 10 includes a conveyor device 30. A plurality of, here three, collaborative robots 20A, 20B, and 20C are arranged side by side along the conveyor device 30 on one side of the conveyor device 30. Screw feeders 80A, 80B, and 80C for supplying screws to the collaborative robots 20A, 20B, and 20C are installed in proximity to the three collaborative robots 20A, 20B, and 20C. The screw feeders 80 supply screws to the collaborative robots 20 in accordance with instructions from the collaborative robots 20. Standing positions of a plurality of workers 100A, 100B, 100C, 100D, 100E, 100F, and 100G are determined on the other side of the conveyor device 30. A touch panel display 60 and a plurality of completion buttons 37A, 37B, 37C, 37D, 37E, 37F, and 37G are attached to the conveyor device 30. The completion buttons 37A, 37B, 37C, 37D, 37E, 37F, and 37G are arranged at positions corresponding to the standing positions of the workers 100A, 100B, 100C, 100D, 100E, 100F, and 100G, respectively. In the following description, they are each referred to as a collaborative robot 20, a completion button 37, or a worker 100 if no distinction is necessary.

(Integrated Controller 70)

Figure 2:
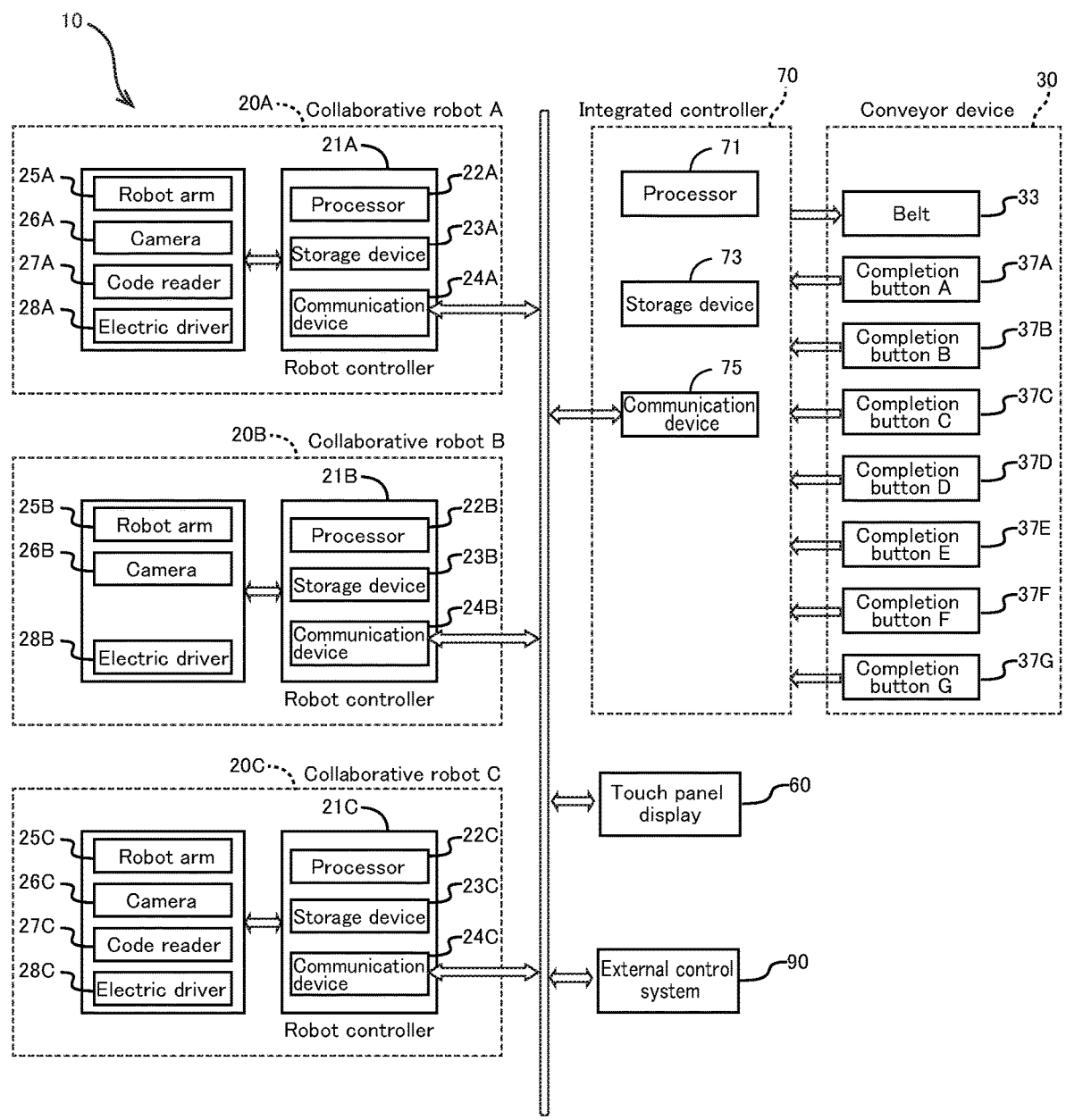
FIG. 2 is a system configuration diagram of the assembly system of FIG. 1.

An integrated controller 70 integrally controls the assembly system 10. As shown in FIG. 2, the integrated controller 70 includes a processor 71. A storage device 73 and a communication device 75 are connected to the processor 71 via a data/control bus.

The storage device 73 stores a plurality of assembly programs for controlling the conveyor device 30 and the collaborative robot 20 in accordance with the finished product to be assembled. Each assembly program is a program that describes the operation timing of the collaborative robot 20, the reading operation of identification information by a code reader 27, and the drive timing of the conveyor device 30. By the assembly program being executed by the processor 71, the collaborative robot 20 and the conveyor device 30 execute predetermined operations. The assembly program is associated with a component type determination program.

The component type determination program is a program for determining whether the type of the component placed on the workpiece is correct or incorrect based on the identification information read by the code reader 27. When the processor 71 executes the component type determination program, for example, the component specification (component code) of the correct type of component supplied from an external control system 90 is used as a reference code, and a component code identified from the identification information of the component placed on the workpiece is compared with the reference code, thereby determining whether the component placed on the workpiece is correct or incorrect.

Figure 3:
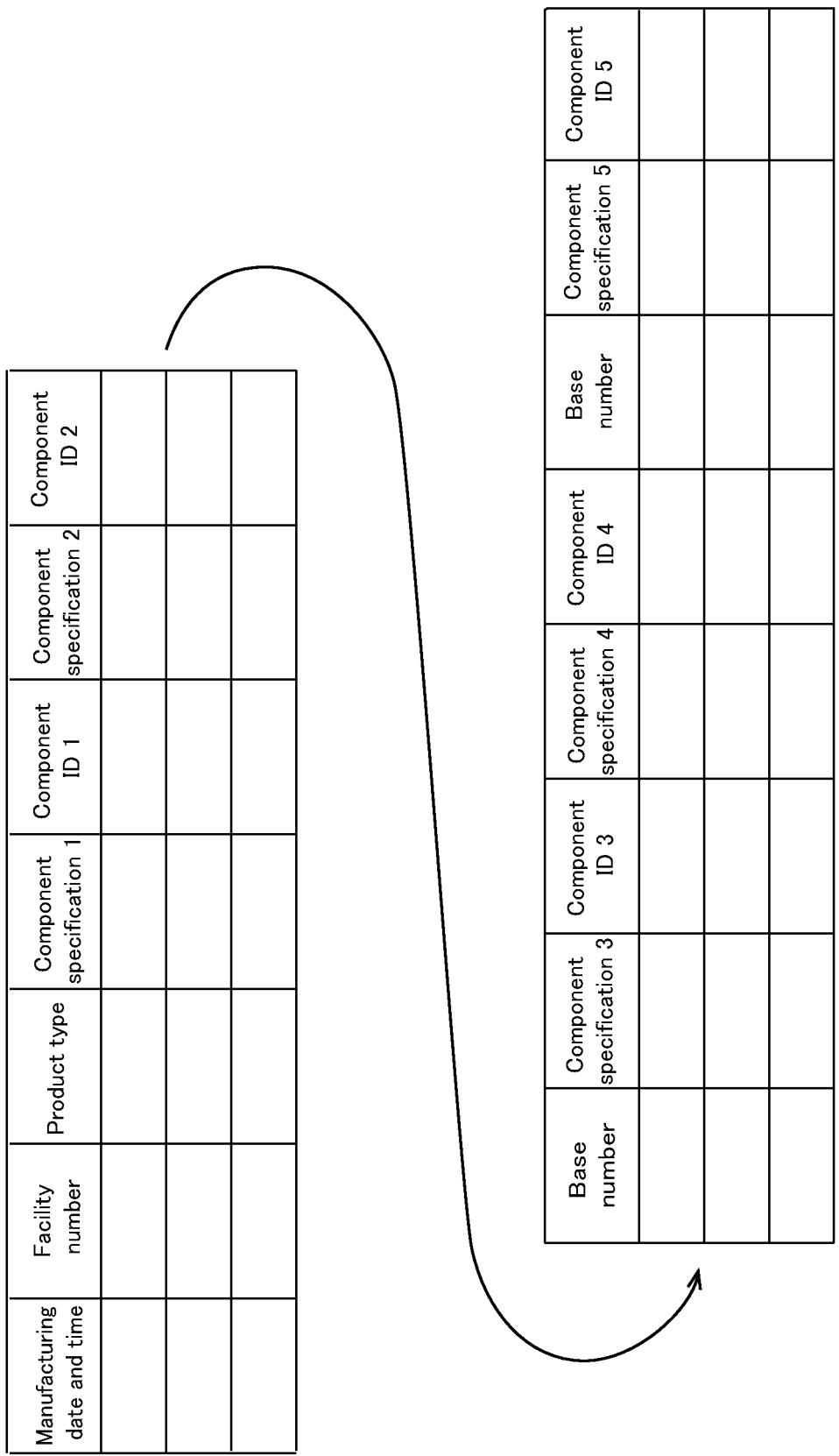
FIG. 3 is a diagram showing an example of a product management table stored in a storage device in FIG. 2.

The storage device 73 stores data of a finished product management table in which identification information of a workpiece read by the code reader 27 is registered. As shown in FIG. 3, in the finished product management table, a facility number, a product type, a base number, a component specification, and a component ID are associated with a manufacturing date and time. For example, the manufacturing date and time indicates the date and time when the finished product was manufactured, and for example, the date and time when the identification information was last read is registered. The facility number indicates the facility in which the finished product was manufactured, and for example, a production line number input by a worker's operation on a setting screen displayed on the touch panel display 60 is registered. The product type indicates the type of the finished product, and for example, the name of the type of the finished product input by a worker's operation on a setting screen displayed on the touch panel display 60 or a code corresponding to the name is registered. The base number is a serial number for identifying the finished product, and in the present embodiment, the result of reading base identification information attached to the base serving as the workpiece is registered. The component specification indicates the type of the component, and the result of reading identification information indicated on the component is registered. The component ID is a serial number for identifying the component individually or a lot number for identifying the component by lot, and the result of reading identification information indicated on the component is registered.

Since finished products can be individually managed in the finished product management table as described above only by reading the identification information indicated on workpieces and components with the code reader 27, the need for worker's manual work such as input work to a check sheet is eliminated, inspection can be easily performed, and when and where a defective product occurred can be easily identified.

The integrated controller 70 is communicatively connected to the collaborative robot 20, the touch panel display 60, and the external control system 90 via the communication device 75. Further, the conveyor device 30 is connected to the integrated controller 70 via various interfaces.

For example, the processor 71 registers identification information received from the collaborative robot 20 via the communication device 75 in the finished product management table, and executes the process of determining whether the component is correct or incorrect. When it is determined that the component is "correct", the processor 71 transmits an operation permission signal to the collaborative robot 20 via the communication device 75. The finished product management table may be managed by the external control system 90. In this case, the processor 71 transfers the identification information received from the collaborative robot 20 to the external control system 90 via the communication device 75.

The processor 71 selects one assembly program from a plurality of assembly programs in accordance with finished product information specifying a finished product received from the external control system 90 via the communication device 75, and transfers the finished product information to the collaborative robot 20. The finished product information may be input by a worker via the touch panel display 60 to be described later.

(Collaborative Robot 20)

The collaborative robot 20 is an industrial robot provided with safety measures so that it can work together with a person in the same space. For example, as the collaborative robot 20, an industrial robot in which the movable range of each joint of the robot is limited physically or by software, an industrial robot that can detect the approach of a person and decelerate, an industrial robot that can detect the contact of a person and stop, and the like can be used.

As shown in FIG. 2, the collaborative robot 20 has a robot arm 25 with a plurality of joints. A camera (image capturing unit) 26 for capturing an image of the component fixed to the workpiece, a code reader (identification information reading unit) 27 for reading identification information, such as a QR code (registered trademark) or a bar code, indicated on the workpiece and the component, and an electric driver (screwing unit) 28 for fixing the component placed on the workpiece to the workpiece are attached to the tip of the robot arm 25 as end effectors. Typically, the camera 26 and the code reader 27 are attached so that their optical axes are parallel to the axial direction of the electric driver 28. In many cases, a screw hole is formed and identification information is shown on the same surface of a workpiece; therefore, aligning the axis of the electric driver 28, the optical axis of the code reader 27, and the optical axis of the camera 26 as described above eliminates the need for moving the robot arm 25 largely each time the work of reading identification information by the code reader 27, the work of screwing by the electric driver 28, and the work of capturing an image of the component fixed to the workpiece by the camera 26 are performed, so that the work time can be shortened and the safety of the worker can be improved.

By equipping the robot arm 25 with the camera 26 and the code reader 27, the camera 26 and the code reader 27 can be directed to the workpiece from various angles, which makes it possible to flexibly cope with the orientations of the workpiece and the component. However, they are not necessarily attached to the robot arm 25. As described above, the code reader 27 may be attached to any position where the code reader 27 can read identification information shown on the component placed on the workpiece. Similarly, the camera 26 may be attached to any position where the camera 26 can capture an image of the component fixed to the workpiece. For example, the camera 26 and the code reader 27 are attached to positions where the camera 26 and the code reader 27 view the belt 33 from above. The camera 26 may also serve as the code reader 27.

The robot arm 25, the camera 26, the code reader 27, and the electric driver 28 are controlled by a robot controller 21. The robot controller 21 includes a processor 22, a storage device 23, and a communication device 24.

The storage device 23 stores a plurality of robot control programs for causing the collaborative robot 20 to execute assembly work corresponding to the finished product to be assembled. Each robot control program is a program that describes a series of operations relating to the movement of the hand reference point of the robot arm 25, the screwing operation by the electric driver 28, and the operation of capturing an image of the component by the camera 26. When the robot control program is executed by the processor 22, the robot arm 25, the camera 26, and the electric driver 28 operate in the order described in the robot control program. A component fixation state determination program is associated with the robot control program.

The component fixation state determination program is a program for determining whether the fixation state of the component fixed to the workpiece is good or bad based on the component image captured by the camera 26. The fixation state "good" refers to a state in which the position and orientation of the component are correct. The process of determining the fixation state of the component may be performed before the component is fixed to the workpiece as a process of determining the placement state of the component. Since the position and orientation of the component can be determined before the component is fixed to the workpiece, even if an abnormality occurs, only changing the position and orientation of the component is required, and there is no need to remove screws; therefore, recovery work is easy and the number of discarded components can be reduced. The determination of the fixation state of the component performed after the component is fixed to the workpiece may include an abnormality determination relating to screwing, such as forgetting to screw, loosening of a screw, or jamming of a screw. When the processor 22 executes a component process state determination program, for example, a component image when the fixation state of the component fixed to the workpiece is "good" is used as a reference image, and the component image of the component fixed to the workpiece is compared with the reference image, thereby determining whether the fixation state of the component fixed to the workpiece is good or bad.

The collaborative robot 20 is communicatively connected to the integrated controller 70 via the communication device 24. For example, the processor 22 selects one robot control program from a plurality of robot control programs in accordance with finished product information specifying a finished product received from the integrated controller 70 via the communication device 24. Further, the processor 22 transmits the result of the determination on whether the fixation state of the component fixed to the workpiece is good or bad and data of the identification information read by the code reader 27 to the integrated controller 70 via the communication device 24.

The collaborative robot 20 may be configured to be directly connected to the external control system 90 to be described below via the communication device 24, and may receive the aforementioned finished product information without the intervention of the integrated controller 70.

(Conveyor Device 30)

As shown in FIGS. 1 and 2, the conveyor device 30 has a belt 33 on which a workpiece is placed. The belt 33 is moved at a preset speed by driving a motor (not shown) in accordance with the control of the integrated controller 70, and conveys the workpiece placed on the belt 33 to the work position of the next process. The conveyor device 30 is provided with a mechanism (not shown) for positioning a workpiece at a work position of each process in order to improve the workability of assembly work by the worker or the collaborative robot 20.

The work position, the installation position of the collaborative robot 20, and the standing position of the worker 100 are determined so as to have the following relationship. That is, the standing position of the worker 100 is determined so that the work position is included in the working range of the hands of the worker 100. The installation position of the collaborative robot 20 is determined so that the work position is included in the movable range of the hand of the collaborative robot 20 and the standing position of the worker 100 is not included in the movable range of the hand of the collaborative robot 20. Accordingly, the worker 100 and the collaborative robot 20 can collaborate in work on the workpiece placed on the belt 33, and the hand of the collaborative robot 20 does not reach the standing position of the worker 100, and thus can physically avoid contact with the head and body of the worker 100 which may lead to a serious injury, thereby improving safety.

In the present embodiment, the belt 33 is composed of a belt 33A for conveying a workpiece to work positions of processes 1 and 2 in order, a belt 33B for conveying the workpiece conveyed from the work position of process 2 by the belt 33A to work positions of processes 3 and 4 in order, a belt 33C for conveying the workpiece conveyed from the work position of process 4 by the belt 33B to work positions of processes 5 and 6 in order, and a belt 33D for conveying the workpiece conveyed from the work position of process 6 by the belt 33C to a work position of process 7. The belts 33A, 33B, 33C, and 33D are driven individually. Of course, the conveyor device 30 may have an independent belt for each process.

(Touch Panel Display 60)

The touch panel display 60 functions as a display device for displaying various kinds of information relating to assembly work and also functions as an input device for receiving a prescribed input from the worker. Of course, the assembly system 10 may have an input device and a display device separately. On the touch panel display 60, various setting screens, a confirmation screen of the work status of assembly work, and the like are displayed in accordance with the control of the integrated controller 70. The user can change various settings, etc. by operating the screen displayed on the touch panel display 60.

For example, the touch panel display 60 displays the confirmation screen of the work status of assembly work as shown in FIG. 4. As shown in FIG. 4, the confirmation screen shows a "facility number" identifying the assembly system 10, a "product type" indicating the type of the finished product, a "planned number/actual number" indicating the present number of finished products manufactured together with the planned number of finished products manufactured on that day, and a common tact time for each process. As the status of the collaborative robot 20, at least one of the three statuses of "in the initial position", "ready for operation", and "in operation" is shown. As the status of the conveyor device 30, at least one of the three statuses of "in the initial position", "ready for operation", and "in operation" is shown. Since the assembly system 10 can be restarted and started when the collaborative robot 20 and the conveyor device 30 are both in the initial position, displaying this on the touch panel display 60 allows the person in charge of the assembly work to know at a glance whether or not the collaborative robot 20 and the conveyor device 30 are in the initial position. This allows the above startup and restart to be performed quickly. This is one factor that improves work efficiency, although it is not a direct factor.

On the confirmation screen, as information indicating the status of each process, information indicating the presence or absence of a workpiece and information indicating the progress status of work are shown for each process. The progress status of work includes information indicating steps of the process such as "work completed", "workpiece conveyance completed", "screwing in progress", "screwing completed", "type inspection passed", and "assembly inspection passed". The person in charge of assembly work can confirm the status of each process displayed on the touch panel display 60 and thereby confirm the progress status of the work for each process and the conveyance status of the workpiece in real time, so that the person can improve the overall manufacturing efficiency by following up or teaching the work to the worker of the process that is not progressing, or the like.

Alarm information is shown on the confirmation screen. The alarm information includes the date and time when the alarm occurred and the details of the abnormality. The details of the abnormality include, for example, a screwing abnormality by the collaborative robot 20, a communication abnormality between the collaborative robot 20 and the integrated controller 70, a communication abnormality between the integrated controller 70 and the external control system 90, and the like. Since the person in charge of assembly work can immediately confirm what kind of abnormality has occurred in which process, the person can take measures corresponding to the details of the abnormality.

The confirmation screen may show one of five statuses of "slow", "slightly slow", "normal", "slightly fast", and "fast" as the work status of each process. The above status is changed in accordance with the time difference of the work time with respect to the tact time. For example, "slow (fast)" is shown when it is 10 seconds or more slower (faster) than the tact time, "slightly slow (fast)" is shown when it is 5 seconds or more and less than 10 seconds slower (faster) than the tact time, and "normal" is shown when it is less than 5 seconds later or faster than the tact time. The person in charge of assembly work can improve the overall manufacturing efficiency by confirming the work status of each process displayed on the touch panel display 60, and following up or teaching the work to the worker who is slow in the work, or the like.

(Procedure of Assembly Work)

An example of the assembly work of assembling a finished product utilizing the assembly system 10 according to the present embodiment will be described with reference to FIGS. 5, 6, and 7. As shown in FIG. 5, the assembly work for assembling a finished product consists of a plurality of processes, here seven processes. Process 1, process 2, process 5, and process 7 are processes in which the worker 100 work alone, while process 3, process 4, and process 6 are processes in which the collaborative robot 20 and the worker 100 work collaboratively. A work procedure is also determined for each process. The collaborative robots 20A, 20B, and 20C operate in accordance with robot control programs corresponding to process 3, process 4, and process 6, respectively.

Figure 6:
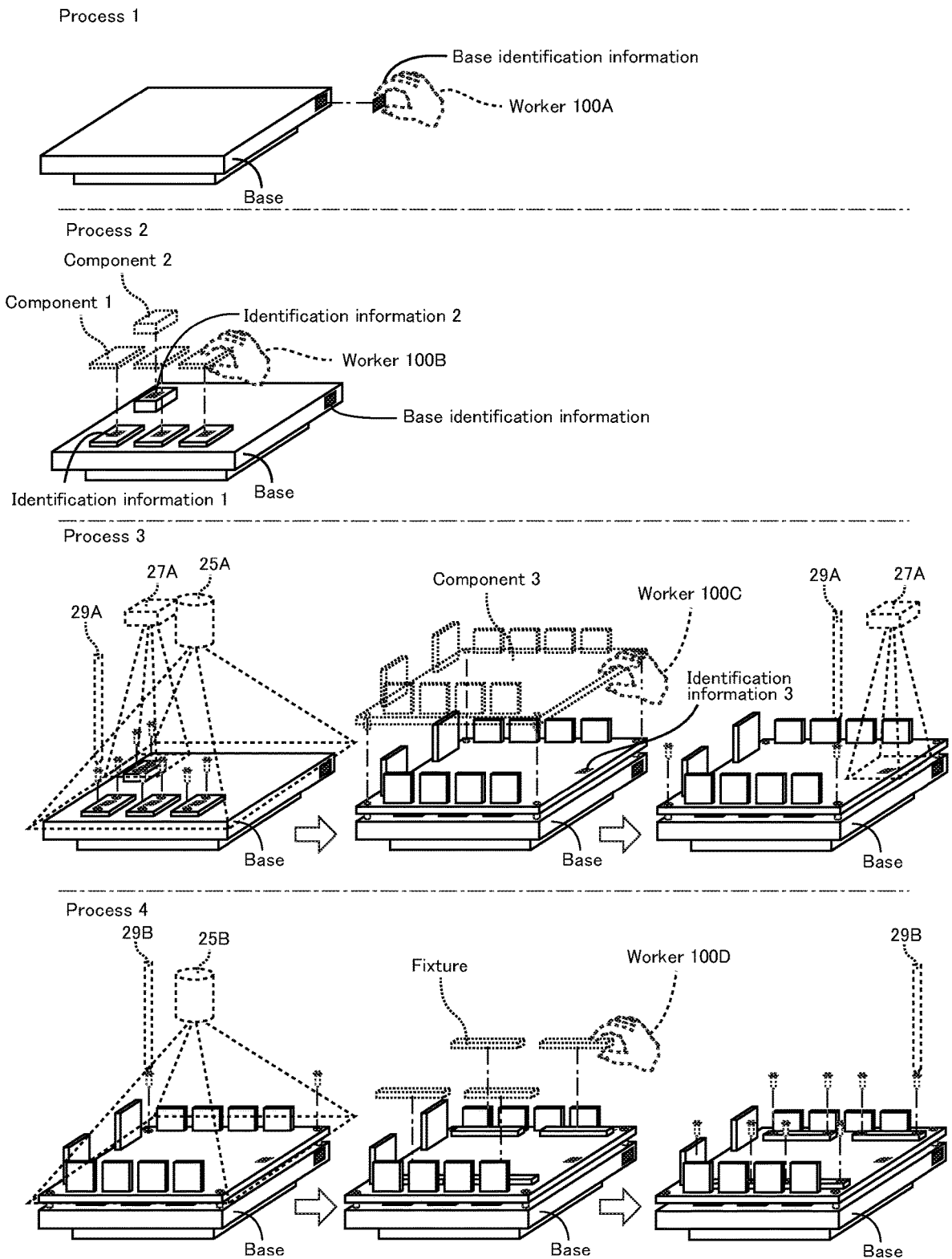
FIG. 6 is a supplementary explanatory diagram for explaining processes 1 to 4 in FIG. 5.

As shown in FIG. 6, in process 1, a worker 100A places a base (workpiece) on the belt 33 (S11), and attaches a seal on which identification information 1 for traceability (QR code (registered trademark)) is printed to the base (S12). When the work is completed, the worker 100A presses an work completion button 37A. The completion of the work of process 1 is thereby input to the integrated controller 70.

In process 2, a worker 100B sets a template for positioning components on the base, and places components 1 and 2 in accordance with the template (S21, S22). When the work is completed, the worker 100B presses an work completion button 37B. The completion of the work of process 2 is thereby input to the integrated controller 70.

In process 3, the robot controller 21A moves the robot arm 25A to a position where the code reader 27A can read the base identification information attached to the base in process 1. The integrated controller 70 controls the code reader 27A to read the base identification information, and registers the read base identification information in an internal data memory, here, the finished product management table (S31).

Next, the robot controller 21A sequentially moves the robot arm 25A to positions where the code reader 27A can read identification information 1 and 2 of the components 1 and component 2 placed on the base. The integrated controller 70 controls the code reader 27A to sequentially read the identification information 1 and 2 of the components 1 and 2, registers the read identification information 1 and 2 in the finished product management table, and determines whether the components 1 and 2 placed on the base are correct or incorrect based on the identification information 1 and 2. When the integrated controller 70 determines that the components 1 and 2 are of the correct type, the integrated controller 70 transmits an operation permission signal to the robot controller 21A. When the robot controller 21A receives the operation permission signal (S32), the robot controller 21A restarts control of the robot arm 25A.

The robot controller 21A controls the electric driver 28A to screw the components 1 and 2 to the base (S33), and controls the camera 26A to capture images of the components 1 and 2 fixed to the base. The robot controller 21A determines whether the fixation state of the components 1 and 2 fixed to the base is good or bad based on the captured component images of the components 1 and 2 (S34). When the robot controller 21A determines that the fixation state of the components 1 and 2 is "good", the robot controller 21A continues the control of the robot arm 25A to continue the operation. On the other hand, when the robot controller 21A determines that the fixation state of the components 1 and 2 is "bad", the robot controller 21A stops the control of the robot arm 25A to temporarily stop the operation of the robot arm 25A, and transmits a signal indicating that the fixation state of the components 1 and 2 is "bad" to the integrated controller 70.

A worker 100C removes the template for positioning components from the base, places a component 3 on the base, and presses a work completion button 37C (S35).

When the work completion button 37C is pressed, the robot controller 21A moves the robot arm 25A to a position where the code reader 27A can read identification information 3 of the component 3 placed on the base. The integrated controller 70 controls the code reader 27A to read the identification information 3 of the component 3, registers the read identification information 3 in the finished product management table, and determines whether the component 3 placed on the base is correct or incorrect based on the identification information 3. When the integrated controller 70 determines that the component 3 is of the correct type, the integrated controller 70 transmits an operation permission signal to the robot controller 21A. When the robot controller 21A receives the operation permission signal (S36), the robot controller 21A restarts control of the robot arm 25A.

The robot controller 21A controls the electric driver 28A to screw the component 3 to the base (S37), returns the robot arm 25A to the initial position, and transmits a work completion signal indicating work completion to the integrated controller 70. In order to keep the work of the process 3 within the tact time, not all screws are screwed in step S37.

In process 4, the robot controller 21B controls the electric driver 28B to screw the remaining screws for fixing the component 3 to the base (S41), and controls the camera 26B to capture an image of the component 3 fixed to the base. The robot controller 21B determines whether the fixation state of the component 3 fixed to the base is good or bad based on the captured component image of the component 3 (S42). When the robot controller 21B determines that the fixation state of the component 3 is "good", the robot controller 21B continues the control of the robot arm 25B to continue the operation. On the other hand, when the robot controller 21B determines that the fixation state of the component 3 is "bad", the robot controller 21B stops the control of the robot arm 25B to temporarily stop the operation of the robot arm 25B, and transmits a signal indicating that the fixation state of the component 3 is "bad" to the integrated controller 70.

A worker 100D places a fixture on the base by using a jig and presses a work completion button 37D (S43). When the work completion button 37D is pressed, the robot controller 21B controls the electric driver 28B to screw the fixture to the base (S44), returns the robot arm 25B to the initial position, and transmits a work completion signal to the integrated controller 70.

Figure 7:
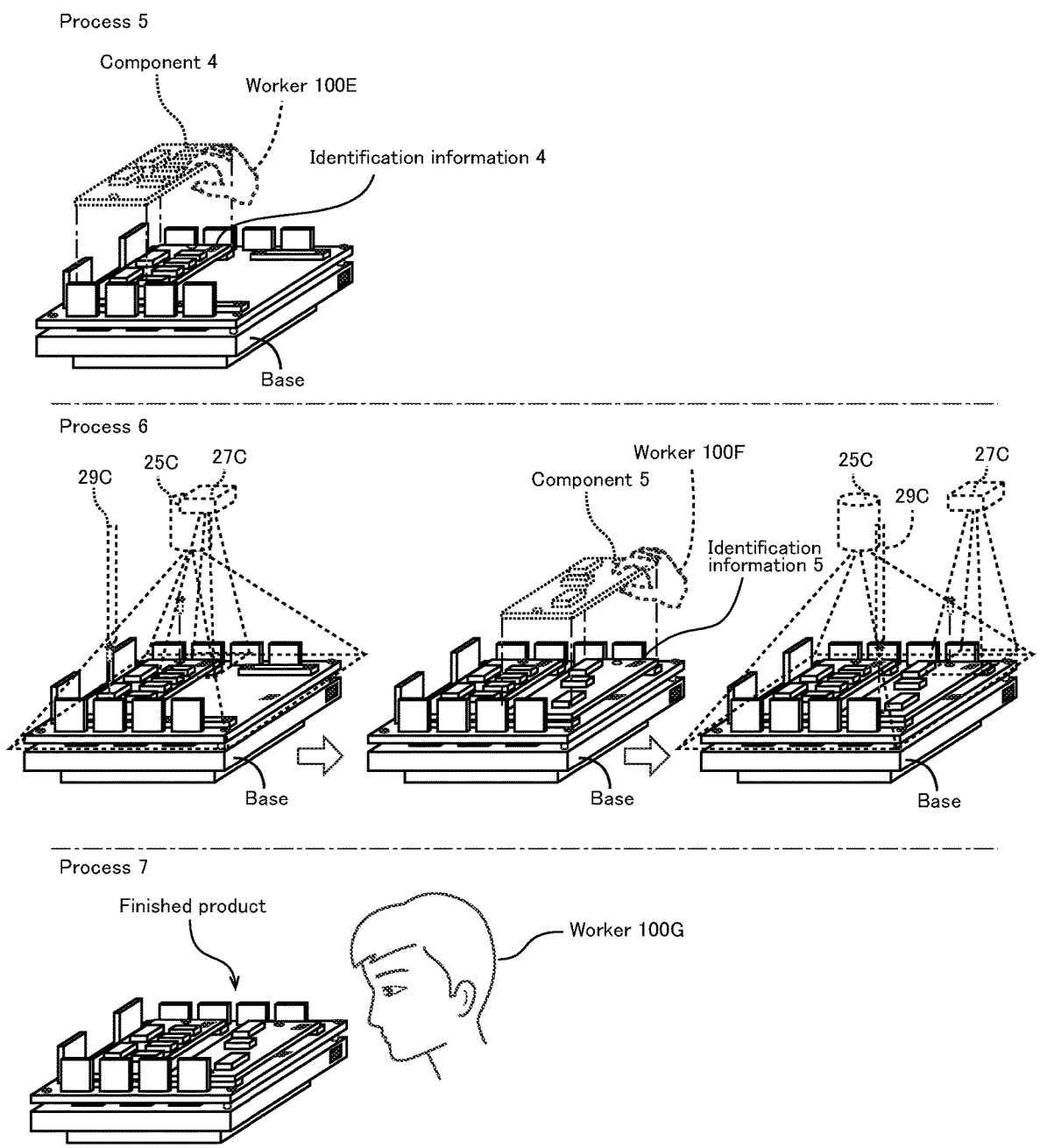
FIG. 7 is a supplementary explanatory diagram for explaining processes 5 to 7 in FIG. 5.

As shown in FIG. 7, in process 5, a worker 100E removes the jig from the base and places a component 4 on the base (S51). When the work is completed, the worker 100E presses an work completion button 37E. The completion of the work of process 5 is thereby input to the integrated controller 70.

In process 6, the robot controller 21C moves the robot arm 25C to a position where the code reader 27C can read the base identification information attached to the base in process 1. The integrated controller 70 controls the code reader 27C to read the base identification information, and registers the read base identification information in an internal data memory, here, the finished product management table (S61).

Next, the robot controller 21C moves the robot arm 25C to a position where the code reader 27C can read identification information 4 of the component 4 placed on the base. The integrated controller 70 controls the code reader 27C to read the identification information 4 of the component 4, registers the read identification information 4 in the finished product management table, and determines whether the component 4 placed on the base is correct or incorrect based on the identification information 4. When the integrated controller 70 determines that the component 4 is of the correct type, the integrated controller 70 transmits an operation permission signal to the robot controller 21C. When the robot controller 21C receives the operation permission signal (S62), the robot controller 21C restarts control of the robot arm 25C.

The robot controller 21C controls the electric driver 28C to screw the component 4 to the base (S63), and controls the camera 26C to capture an image of the component 4 fixed to the base. The robot controller 21C determines whether the fixation state of the component 4 fixed to the base is good or bad based on the captured component image of the component 4 (S64). When the robot controller 21C determines that the fixation state of the component 4 is "good", the robot controller 21C continues the control of the robot arm 25C to continue the operation. On the other hand, when the robot controller 21C determines that the fixation state of the component 4 is "bad", the robot controller 21C stops the control of the robot arm 25C to temporarily stop the operation of the robot arm 25C, and transmits a signal indicating that the fixation state of the component 4 is "bad" to the integrated controller 70.

A worker 100F places a component 5 on the base and presses a work completion button 37F (S65). When the work completion button 37F is pressed, the robot controller 21C moves the robot arm 25C to a position where the code reader 27C can read identification information 5 of the component 5 placed on the base. The integrated controller 70 controls the code reader 27C to read the identification information 5 of the component 5, registers the read identification information 5 in the finished product management table, and determines whether the component 5 placed on the base is correct or incorrect based on the identification information 5. When the integrated controller 70 determines that the component 5 is of the correct type, the integrated controller 70 transmits an operation permission signal to the robot controller 21C. When the robot controller 21C receives the operation permission signal (S66), the robot controller 21C restarts control of the robot arm 25C.

The robot controller 21C controls the electric driver 28C to screw the component 5 to the base (S67), and controls the camera 26C to capture an image of the component 5 fixed to the base. The robot controller 21C determines whether the fixation state of the component 5 fixed to the base is good or bad based on the captured component image of the component 5 (S68). When the robot controller 21C determines that the fixation state of the component 5 is "good", the robot controller 21C returns the robot arm 25C to the initial position and transmits a work completion signal to the integrated controller 70. On the other hand, when the robot controller 21C determines that the fixation state of the component 5 is "bad", the robot controller 21C stops the control of the robot arm 25C to temporarily stop the operation of the robot arm 25C, and transmits a signal indicating that the fixation state of the component 5 is "bad" to the integrated controller 70.

In process 7, a worker 100G performs a final visual inspection of the finished product, assembling of which has been completed in the previous process 6 (S71), and stores the finished product in a finished product storage rack (S72). When the work is completed, the worker 100G presses an work completion button 37G. The completion of the work of process 7 is thereby input to the integrated controller 70. When the work completion button 37G is pressed, the actual number of manufactured products managed by the integrated controller 70 is added. This facilitates the management of actually-manufactured products.

The integrated controller 70 drives the belts 33A, 33B, 33C, and 33D of the conveyor device 30 in accordance with a predetermined conveyance condition. For example, when the work of a specific process has been completed and the work of the subsequent process to which the workpiece is to be carried has been completed and the workpiece has been carried out, the belt corresponding to the specific process and the belt corresponding to the subsequent process are driven. As a result, the workpiece the work on which has been completed in the specific process is conveyed to the subsequent process. Since the belts 33A, 33B, 33C, and 33D can be driven individually in accordance with the work status of the specific process and the work status of the subsequent process, the overall work efficiency can be improved.

When the integrated controller 70 determines in processes 3 and 6 that the type of the component placed on the workpiece is not correct, the integrated controller 70 suspends the transmission of an operation permission signal to the robot controller 21 in order to stop the operation of the robot arm 25. Further, the integrated controller 70 lights a lamp (not shown) attached to the conveyor device 30 in such a manner as to notify that an abnormality has occurred, and indicates the details of the occurred abnormality on the touch panel display 60.

Similarly, when the integrated controller 70 receives from the robot controller 21 a signal indicating that the fixation state of the component fixed to the workpiece is "bad" in process 3, process 4, and process 6, the integrated controller 70 lights a lamp (not shown) attached to the conveyor device 30 in such a manner as to notify that an abnormality has occurred, and indicates the details of the occurred abnormality on the touch panel display 60.

In this manner, when a work error occurs, such as a situation in which the component placed on the workpiece is incorrect or a situation in which the fixation state of the component fixed to the workpiece is bad, the operation of the collaborative robot 20 (assembly system 10) is stopped and a process of notifying the worker of the occurrence of an abnormality is executed. The worker can quickly know the occurrence of the abnormality by the lighting of the lamp attached to the conveyor device 30, and can immediately start the recovery work by confirming the details of the abnormality displayed on the touch panel display 60. After the recovery work is completed, the worker can restart the assembly work by the assembly system 10 from the middle by, for example, pressing the work completion button 37 of the process in which the abnormality occurred.

As described above, by stopping the assembly system 10 every time an abnormality occurs, the cause of occurrence of the abnormality can be immediately identified. As a result, it is possible to reduce the number of defective products, for example, by preventing all finished products manufactured in a certain period of time from being defective, and suppress disposal of components due to defective products.

From the viewpoint of manufacturing efficiency of finished products, instead of stopping the assembly system 10 every time an abnormality occurs, a marker may be provided to a workpiece on which an abnormality occurred so that no further assembly work is performed thereon. For example, a tag indicating that an abnormality occurred on a workpiece may be prepared, and when an abnormality occurs, the collaborative robot 20 may place the tag on the workpiece. The worker placed in a downstream process may confirm that the workpiece is the one on which an abnormality occurred and press the work completion button 37 without performing the work. Of course, the integrated controller 70 can grasp on which workpiece an abnormality occurred; therefore, the integrated controller 70 can prevent the collaborative robot 20 placed in a downstream process from working on the workpiece on which an abnormality occurred. The worker of the final process stores the workpiece on which an abnormality occurred in a storage rack for defective products. By not stopping the assembly system 10 even when an abnormality occurs as described above, the manufacturing efficiency of finished products may be improved.

It is desirable that the worker can select whether or not to stop the assembly system 10 when an abnormality occurs. For example, if the assembly work is already skilled and highly reliable, the overall manufacturing efficiency can be improved by not stopping the assembly system 10 when an abnormality occurs, since the frequency of occurrence of an abnormality is low in the first place. On the other hand, if the assembly work is newly started, it is preferable to stop the assembly system 10 when an abnormality occurs since the frequency of occurrence of an abnormality is high and it is necessary to immediately grasp what kind of abnormality has occurred.

In addition, whether a component is correct or incorrect is determined at the time when the component is placed on the workpiece before the component is fixed to the workpiece; therefore, even if the component is incorrect and the assembly system 10 is stopped, the incorrect component only needs to be replaced with a correct component because the component is not fixed to the workpiece, and the stopped assembly system 10 can be immediately restarted. That is, determining whether a component is correct or incorrect before the component is fixed to the workpiece facilitates the recovery work when the component is incorrect in comparison with the case where whether a component is correct or incorrect is determined after the component is fixed to the workpiece, thereby improving the work efficiency.

Similarly, the fixation state of the component fixed to the workpiece is determined before another component is placed; therefore, even if the fixation state of the component is bad and the assembly system 10 is stopped, the worker only needs to redo the work of fixing the component whose fixation state was determined as bad and can immediately restart the stopped assembly system 10. Of course, there may be a case where the fixation state of a component is bad, and the component needs to be discarded and a new component needs to be fixed, but even in such a case, only the component whose fixation state is bad needs to be discarded, and the situation where other components need to be discarded can be avoided.

In this way, by inspecting the type of the component every time a component is placed on the workpiece and inspecting the fixation state of the component every time a component is fixed to the workpiece, the time in which the assembly system 10 is stopped due to inspection failure can be reduced, and the disposal of components can be minimized.

According to the assembly system 10 according to the present embodiment, by equipping the robot arm 25 with the camera 26 and the code reader 27, inspection can be performed for each process. In addition, since the inspection is automatically performed without the worker's eyes, the inspection quality can be kept more constant than when the worker 100 performs the inspection.

In the case of a finished product whose components are difficult to see in the assembled state, a lot of time is required to collectively inspect the components attached to the finished product; however, by performing inspection for each process, the time required to inspect one component can be reduced, and inspection efficiency can be improved.

By including the inspection work in the process in which the collaborative robot 20 and the worker 100 collaboratively work, rather than providing a work process only for inspection, the worker 100 can prepare for the next work while the collaborative robot 20 is inspecting; therefore, the assembly work and the inspection work of finished products can be efficiently performed without wasting the inspection time by the collaborative robot 20, and the manufacturing efficiency of finished products can be improved. Of course, since there is no need to provide a process for inspection, a space for the process for inspection need not be secured, and the assembly system 10 can be configured in a space-saving manner.

Since the inspection is performed for each process, occurrence of an abnormality can be immediately detected, and countermeasures can be taken by stopping the assembly system 10 so that no further abnormality will occur. As a result, the frequency of occurrence of an abnormality can be reduced, and disposal of components can also be reduced. This effect is particularly noticeable in assembly work of a finished product having many processes. For example, in a system in which inspection is performed in the final process, even if the system is temporarily stopped upon detection of an abnormality in the final process, it is highly likely that the same abnormality has occurred on all the workpieces from the process in which the abnormality occurred to the final process. Therefore, a large number of workpieces are subjected to recovery work such as removing, replacing, and re-fixing a component. Since inspection can be performed for each process as in the present embodiment, the assembly system 10 can be stopped when an abnormality occurs; therefore, the above-described situation can be avoided.

Further, in the present embodiment, the camera 26 can capture an image of the component fixed to the workpiece, and whether the fixation state of the component fixed to the workpiece is good or bad (the position and orientation of the component) can be determined based on the captured component image. This determination may include determination as to abnormalities related to screwing (failure to screw, loosening, or jamming) As a result, the possibility of occurrence of work defectives at the time of the work of fixing a component by the electric driver 28 can be reduced, and the quality can be ensured regardless of the skill level of the worker. It is also possible to determine whether the component itself is good or bad based on the component image of the component placed on the workpiece.

In the present embodiment, the collaborative robot 20 performs the process of determining whether the fixation state of the component is good or bad based on the component image; however, the component image may be provided from the robot controller 21 to the integrated controller 70, and the integrated controller 70 may perform the process of determining whether the fixation state of the component is good or bad. Also, although the integrated controller 70 performs the process of determining whether the type of the component is correct or incorrect based on identification information, the robot controller 21 may perform the process.

Further, the assembly system 10 according to the present embodiment includes the code reader 27 and the camera 26, and inspects both whether the type of the component is correct or incorrect and whether the fixation state of the component is good or bad. However, if at least one of the inspections can be performed, the risk of outflow of defective products can be reduced and the work efficiency of assembly work can be improved. Therefore, the assembly system 10 may include one of the code reader 27 and the camera 26.

Further, in the assembly system 10 according to the present embodiment, the workpiece is placed on the belt 33 and conveyed to the work position of the next process upon completion of all work of each process; however, the configuration of the conveyor device 30 is not limited to this. For example, the belt 33 may be manually moved by the worker. Further, the conveyor device 30 may have a plurality of workbenches (pallets) for placing a workpiece thereon, and each workbench may be independently driven.

In addition, in the assembly system 10 according to the present embodiment, the collaborative robot 20 is used from the viewpoint of safety and applicability; however, a general industrial robot may be used as a device that collaborates with the worker 100. Further, if the device that collaborates with the worker 100 takes charge of only simple work such as screwing work, a work machine other than a robot, such as an air cylinder, can be used as the device. When an operation mechanism other than the collaborative robot 20 is employed, it is desirable to provide a partition or safety fence for physically preventing the operation mechanism from coming into contact with the worker. The assembly system 10 configured as described above can also achieve the same effects as those of the present embodiment.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

EXPLANATION OF REFERENCE NUMERALS

10: assembly system, 20: collaborative robot, 21: robot controller, 23: robot arm, 25: camera, 27: code reader, 29: electric driver, 30: conveyor device, 33: belt, 37: completion button, 60: touch panel display, 70: integrated controller, 71: processor, 73: storage device, 75: communication device, 90: external control system.

The invention claimed is:
1. An assembly system for assembling a finished product while sequentially placing and fixing multiple types of components to a workpiece, the assembly system comprising:

a collaborative robot configured to collaborate with a worker;

an identification information reading unit configured to read identification information indicated on the component placed on the workpiece; and a controller configured to determine whether a type of the component placed on the workpiece is correct or incorrect based on the read identification information, and control the collaborative robot in accordance with a result of the correctness determination, wherein:

the controller controls the collaborative robot to fix the component on the workpiece when the controller determines that the type of the component placed on the workpiece is correct; and the controller controls the collaborative robot not to fix the component on the workpiece when the controller determines that the type of the component placed on the workpiece is incorrect.

2. The assembly system according to claim 1, wherein the identification information reading unit is attached to the collaborative robot.

3. The assembly system according to claim 1, further comprising:

an image capturing unit configured to capture an image of the component fixed to the workpiece, wherein the controller controls the collaborative robot to continue or stop an operation in accordance with a result of determination on whether a fixation state of the component fixed to the workpiece is good or bad based on the captured image of the component.

4. The assembly system according to claim 3, further comprising a display unit for displaying at least one of the result of the correctness determination, the result of the fixation state determination, the type of the finished product, a number of manufactured finished products, and a state of the collaborative robot.

5. The assembly system according to claim 1, wherein the collaborative robot includes a screwing unit, and the controller permits the collaborative robot to start a screwing operation when the type of the component placed on the workpiece is correct as the result of the correctness determination.

6. The assembly system according to claim 1, further comprising a conveyor device configured to movably support the workpiece.

7. The assembly system according to claim 6, wherein standing positions of the collaborative robot and the worker are placed on both sides of the conveyor device, and the conveyor device is arranged at a position where a movable range of a hand of the collaborative robot and a working range of the worker overlap.

8. The assembly system according to claim 6, wherein the controller controls the conveyor device to move the workpiece when receiving a signal indicating work completion input by the worker or when receiving a signal indicating work completion from the collaborative robot.

9. The assembly system according to claim 1, wherein the controller registers the read identification information in an internal data memory or transmits the read identification information to an external data server.

10. The assembly system according to claim 1, wherein the collaborative robot includes a storage unit for storing a plurality of operation programs, and the controller is communicatively connected to an external system, and instructs the collaborative robot to execute one of the operation programs based on finished product information specifying the finished product received from the external system.

11. The assembly system according to claim 1, further comprising:

an input unit for receiving input of finished product information specifying the finished product from the worker, wherein the collaborative robot includes a storage unit for storing a plurality of operation programs, and the controller instructs the collaborative robot to execute one of the operation programs based on the input finished product information.

12. An assembly system for assembling a finished product while sequentially placing and fixing multiple types of components to a workpiece, the assembly system comprising:

a work machine;

an identification information reading unit configured to read identification information indicated on the component placed on the workpiece; and a controller configured to determine whether a type of the component placed on the workpiece is correct or incorrect based on the read identification information, and control the work machine in accordance with a result of the correctness determination, wherein:

the controller permits the collaborative robot to start the fixing work of the component when the controller determines that the type of the component placed on the workpiece is correct; and the controller does not permit the collaborative robot to start the fixing work of the component when the controller determines that the type of the component placed on the workpiece is incorrect.

* * * * *